(12) United States Patent
Ohtsuka et al.

(10) Patent No.: US 9,710,931 B2
(45) Date of Patent: Jul. 18, 2017

(54) IMAGE PROCESSING SYSTEM WITH HUE ROTATION PROCESSING

(71) Applicant: KAGOSHIMA UNIVERSITY, Kagoshima-shi, Kagoshima (JP)

(72) Inventors: Sakuichi Ohtsuka, Kagoshima (JP); Shoko Hira, Kagoshima (JP); Ken Kihara, Kagoshima (JP)

(73) Assignee: KAGOSHIMA UNIVERSITY, Kagoshima (JP)

( * ) Notice: Subject to any disclaimer, the term of this patent is extended or adjusted under 35 U.S.C. 154(b) by 105 days.

(21) Appl. No.: 14/428,924

(22) PCT Filed: Sep. 19, 2013

(86) PCT No.: PCT/JP2013/075234
§ 371 (c)(1),
(2) Date: Mar. 17, 2015

(87) PCT Pub. No.: WO2014/046155
PCT Pub. Date: Mar. 27, 2014

(65) Prior Publication Data
US 2015/0279057 A1    Oct. 1, 2015

(30) Foreign Application Priority Data

Sep. 19, 2012  (JP) .................. 2012-205704

(51) Int. Cl.
*G06T 11/00* (2006.01)
*H04N 1/60* (2006.01)
(Continued)

(52) U.S. Cl.
CPC ......... *G06T 11/001* (2013.01); *H04N 1/6075* (2013.01); *H04N 9/643* (2013.01); *H04N 9/77* (2013.01)

(58) Field of Classification Search
CPC .... G06T 11/001; H04N 1/6075; H04N 9/643; H04N 9/77; G09G 2340/06
See application file for complete search history.

(56) References Cited

U.S. PATENT DOCUMENTS

2004/0027594 A1  2/2004 Suzuki et al.
2005/0105796 A1  5/2005 Hong et al.
(Continued)

FOREIGN PATENT DOCUMENTS

JP  2004-080118 A  3/2004
JP  2005-524154 A  8/2005
(Continued)

OTHER PUBLICATIONS

Jae-Yun Jeong, Hyun-Ji Kim, Tae-Shick Wang, Yeo-Jin Yoon, and Sung-Jea Ko, An Efficient Re-coloring Method with Information Preserving for the Color-blind, Dec. 2011, IEEE Transactions on Consumer Electronics, vol. 57, Issue: 4, pp. 1953-1960.*
(Continued)

*Primary Examiner* — Jeffery A Brier
(74) *Attorney, Agent, or Firm* — Arent Fox LLP (57) ABSTRACT

Techniques are provided in which a "dichromat" (e.g., a color-blind person) is able to identify the hue of an object without determining the color difference signals that are applied to the original color image. Such features may be implemented by performing hue rotation processing on each pixel data of the original color image captured.

6 Claims, 4 Drawing Sheets

(51) Int. Cl.
    *H04N 9/64*           (2006.01)
    *H04N 9/77*           (2006.01)

(56) References Cited

U.S. PATENT DOCUMENTS

| | | |
|---|---|---|
| 2007/0182755 A1 | 8/2007 | Jones et al. |
| 2012/0169756 A1 | 7/2012 | Ohtsuka |

FOREIGN PATENT DOCUMENTS

| | | |
|---|---|---|
| JP | 2009-530985 A | 8/2009 |
| WO | WO 2008/032528 A1 | 3/2008 |
| WO | WO 2011/030814 A1 | 3/2011 |

OTHER PUBLICATIONS

Translation of the International Preliminary Report on Patentability mailed Mar. 19, 2015 for the corresponding International Patent Application No. PCT/JP2013/075234.
International Search Report of PCT/JP2013/075234 dated Nov. 12, 2013.

\* cited by examiner

IMAGE PROCESSING SYSTEM WITH HUE ROTATION PROCESSING

CROSS-REFERENCE TO RELATED APPLICATION

This application is a National Stage entry of International Application No. PCT/JP2013/075234, filed Sep. 19, 2013, which claims priority to Japanese Patent Application No. 2012-205704, filed Sep. 19, 2012. The disclosures of the priority applications are incorporated in their entirety herein by reference.

TECHNICAL FIELD

The present invention relates to an image processing apparatus and an image processing method that process a color image, and a program that causes a computer to execute the image processing method.

BACKGROUND ART

In the related art, a technique in which a so-called color-blind person (a dichromat) can understand the hue of a color image has been developed (for example, see Patent Literature 1 below).

Specifically, Patent Literature 1 below discloses an image processing apparatus that: performs first conversion processing to convert an original color image (which may also be referred to as "original image") into a luminance signal, a first color difference signal which is a color difference signal of a color pair that is difficult to be identified by a dichromat, and a second color difference signal which is a color difference signal of a color pair that is easy to be identified by the dichromat; performs second conversion processing to convert the value of the first color difference signal acquired by the first conversion processing into the value of the second color difference signal and convert the value of the second color difference signal acquired by the first conversion processing into the value of the first color difference signal; generates a color image subjected to hue conversion on the basis of the luminance signal acquired by the first conversion processing and the first color difference signal after conversion and the second color difference signal after conversion that are acquired by the second conversion processing; and switches and displays the original color image and the color image subjected to hue conversion such that the dichromat can visually check them in the same viewpoint.

CITATION LIST

Patent Literature

Patent Literature 1: International Publication Pamphlet No. WO 2011/030814

SUMMARY OF THE INVENTION

Technical Problem

However, in the technique of Patent Literature 1, since even the color difference signal of the color pair that is easy to be identified by the dichromat is converted into the color difference signal of the color pair that is difficult to be identified by the dichromat in the generation of the color image subjected to hue conversion, learning and experience are required when the dichromat alternately sees the original color image and the color image subjected to hue conversion and complementarily understands the original color image.

The present invention is made in view of such a problem, and it is an object to provide a mechanism in which a dichromat can understand the hue of an object without learning.

Solution to Problem

An image processing apparatus of the present invention includes: color image acquisition means for acquiring a color image of an object, which is expressed by a luminance signal, a first color difference signal that is a color difference signal of a color pair that is easy to be identified by a dichromat and a second difference signal that is a color difference signal of a color pair that is difficult to be identified by the dichromat; color difference signal processing means for performing mixing reprocessing that mixes a component of the second color difference signal with a component of the first color difference signal, for each pixel data of the color image; and display control means for performing control to display the color image processed by the color difference signal processing means on a display unit as a color image subjected to color conversion.

Another mode in the image processing apparatus of the present invention includes: hue rotation processing means for performing hue rotation processing at rotation angle θ at which one color difference signal of two color difference signals in a color space defined by the two color difference signals is set to a first color difference signal that is a color difference signal of a color pair that is easy to be identified by a dichromat and the other color difference signal of the two color difference signals is set to a second difference signal that is a color difference signal of a color pair that is difficult to be identified by the dichromat, for each pixel data of an original color image of an object, which is acquired by imaging the object and expressed by a luminance signal and the two color difference signals; color image acquisition means for acquiring a color image subjected to hue rotation on which the hue rotation processing by the hue rotation processing means is performed; color difference signal processing means for performing mixing processing that mixes a component of the second color difference signal with a component of the first color difference signal, for each pixel data of the color image subjected to hue rotation; reverse hue rotation processing means for performing reverse hue rotation processing at rotation angle −θ in the color space defined by the first color difference signal and the second color difference signal, for each pixel data of the color image processed by the color difference signal processing means; and display control means for performing control to display the color image subjected to the reverse hue rotation processing by the reverse hue rotation processing means on a display unit as a color image subjected to color conversion.

Moreover, the present invention includes an image processing method by the above-mentioned image processing apparatus, and a program that causes a computer to execute the image processing method.

Advantageous Effect of Invention

According to the present invention, it is possible to provide a mechanism in which a dichromat can understand the hue of an object without learning.

DESCRIPTION OF EMBODIMENTS

A mode (embodiment) to implement the present invention is explained below with reference to the drawings. Here, in the embodiment of the present invention explained below, an explanation is given using an example where a multi-function mobile phone (so-called smart phone) is applied as an image processing apparatus according to the present invention, but the present invention is not limited to this, and, for example, it is also possible to apply other image processing apparatuses such as a digital cameras and a PC (personal computer).

Moreover, the embodiment of the present invention explained below describes a mechanism in which, among color-blind persons, a dichromat of type 1 (protanope)/type 2 (deuteranope) who has high occurrence frequency and has difficulty in color identification of the red-green system can understand the hue of an object without learning.

Figure 1:
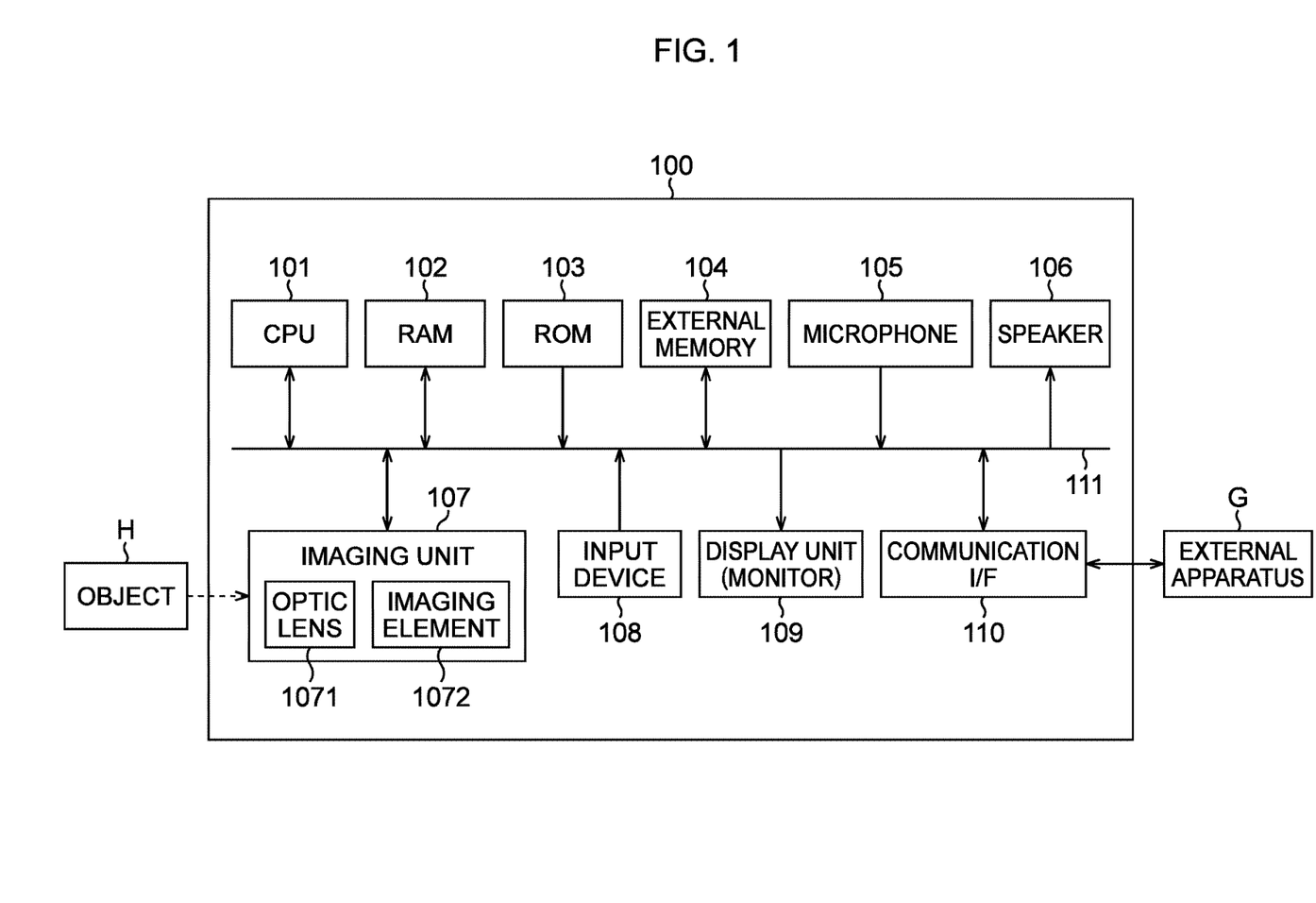
FIG. 1 is a block diagram illustrating one example of hardware components of a multi-function mobile phone machine (image processing apparatus) according to an embodiment of the present invention.

FIG. 1 is a block diagram illustrating one example of hardware components of a multi-function mobile phone (image processing apparatus) 100 according to an embodiment of the present invention.

As illustrated in FIG. 1, the multi-function mobile phone 100 is formed having hardware components of a CPU 101, a RAM 102, a ROM 103, an external memory 104, a microphone 105, a speaker 106, an imaging unit 107, an input device 108, a display unit 109, a communication interface (communication I/F) 110 and a bus 111.

For example, the CPU 101 controls the whole of the multi-function mobile phone 100 by the use of a program, data and information stored in the ROM 103 or the external memory 104.

The RAM 102 is formed with an SDRAM, a DRAM, or the like, includes an area in which the program, data and information loaded from the ROM 103 or the external memory 104 are temporarily stored, and includes a work area required for the CPU 101 to perform various kinds of processing.

The ROM 103 stores information such as a program, various kinds of data and various kinds of parameters which do not have to be changed, and so on.

For example, the external memory 104 stores a program executed by an operating system (OS) or the CPU 101, and, moreover, data and information, and so on, which are assumed to be known in the explanation of the present embodiment. Here, in the present embodiment, it is assumed that a program to perform processing according to the embodiment of the present invention is stored in the external memory 104, but it is applicable even in a mode in which it is stored in, for example, the ROM 103.

The microphone 105 and the speaker 106 are each used for a call as a telephone machine. In addition, the microphone 105 is used to detect voice when a moving image is taken by the imaging unit 107, and the speaker 106 is used to reproduce the voice detected by the microphone 105 when the moving image is reproduced.

The imaging unit 107 takes the optical image of object H as a color image expressed by YCbCr. Here, YCbCr is a color space expressed using luminance signal Y and two color difference signals Cb(B−Y) and Cr(R−Y). In the following, the color image taken by the imaging unit 107 is referred to as "original color image". This imaging unit 107 is formed with an optic lens 1071 and an imaging element 1072. The optic lens 1071 is provided to lead the optical image of object H to the imaging element 1072. The imaging element 1072 is provided to take the optical image of object H led through the optic lens 1071, as an original color image expressed by YCbCr.

For example, the input device 108 is formed with a switch button installed in the multi-function mobile phone 100 and a transparent touch panel installed on the display unit 109, and so on. For example, this input device 108 is operated when the user gives various kinds of instructions to the multi-function mobile phone 100, and inputs the instruction in the CPU 101, and so on.

For example, the display unit 109 is formed including a monitor, and so on, and outputs various kinds of images and various kinds of information to the monitor on the basis of the control of the CPU 101.

The communication I/F 110 manages the transmission and reception of various kinds of information and various kinds of signals, and so on, between the multi-function mobile phone 100 and external apparatus G.

The bus 111 connects the CPU 101, the RAM 102, the ROM 103, the external memory 104, the microphone 105, the speaker 106, the imaging unit 107, the input device 108, the display unit 109 and the communication I/F 110 such that communication is mutually possible.

Figure 2:
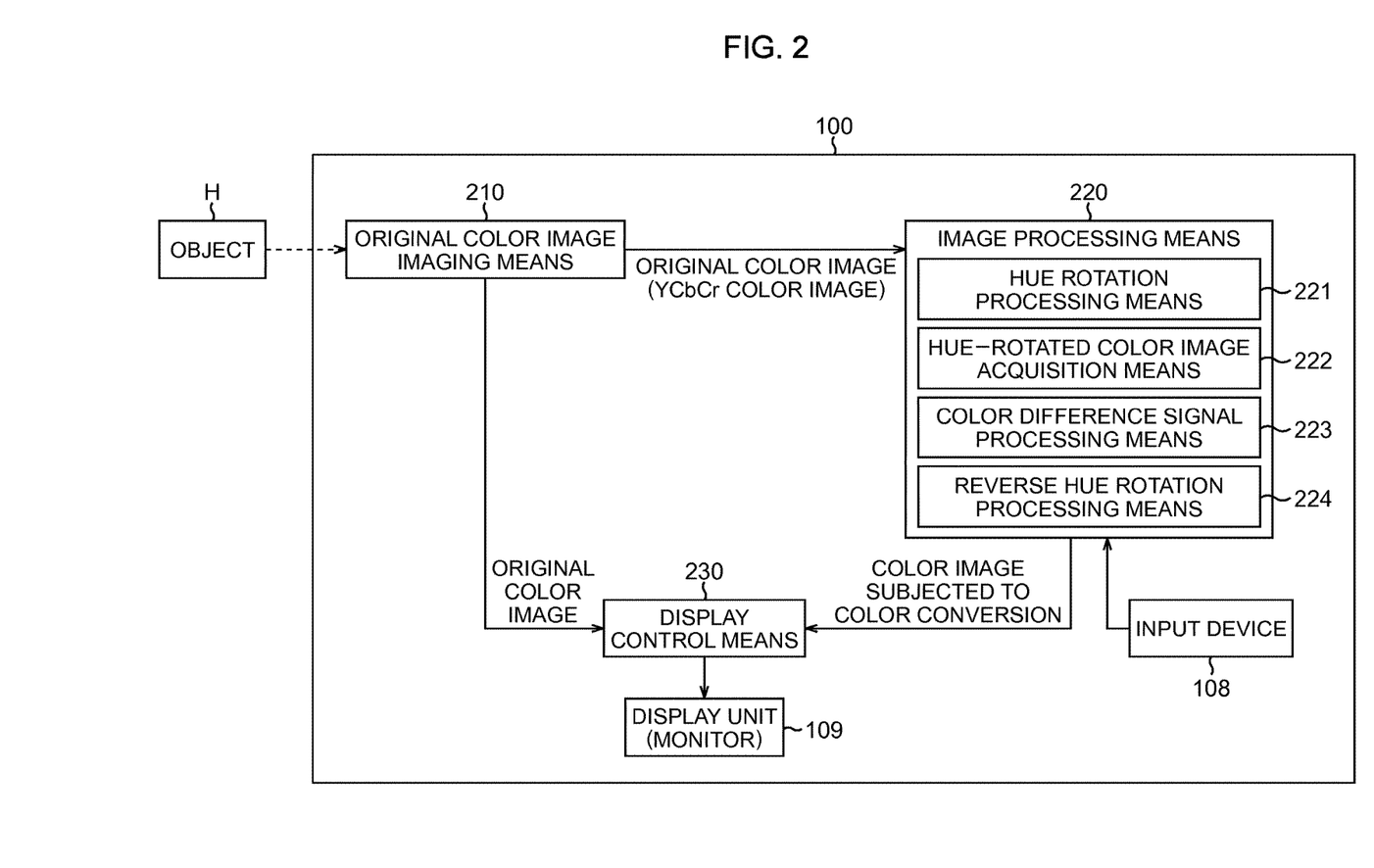
FIG. 2 is a block diagram illustrating one example of functional components of a multi-function mobile phone (image processing apparatus) according to an embodiment of the present invention.

FIG. 2 is a block diagram illustrating one example of functional components of the multi-function mobile phone (image processing apparatus) 100 according to the embodiment of the present invention. In this FIG. 2, the same reference numerals are assigned to components having functions similar to the components illustrated in FIG. 1.

As illustrated in FIG. 2, the multi-function mobile phone 100 is formed having functional components of original color image imaging means 210, image processing means 220, display control means 230, the input device 108 and the display unit 109.

Here, one example of the corresponding relationship between the hardware components of the multi-function mobile phone 100 illustrated in FIG. 1 and the functional components of the multi-function mobile phone 100 illustrated in FIG. 2 is shown below.

For example, the original color image imaging means 210 illustrated in FIG. 2 is formed with the imaging unit 107 illustrated in FIG. 1. Moreover, for example, the image processing means 220 and the display control means 230 illustrated in FIG. 2 are formed with the CPU 101, a program stored in the external memory 104 and the RAM 102 illustrated in FIG. 1.

Subsequently, each functional component illustrated in FIG. 2 is described.

The original color image imaging means 210 takes an original color image of object H expressed by YCbCr on the basis of the optical image of object H.

Figure 3:
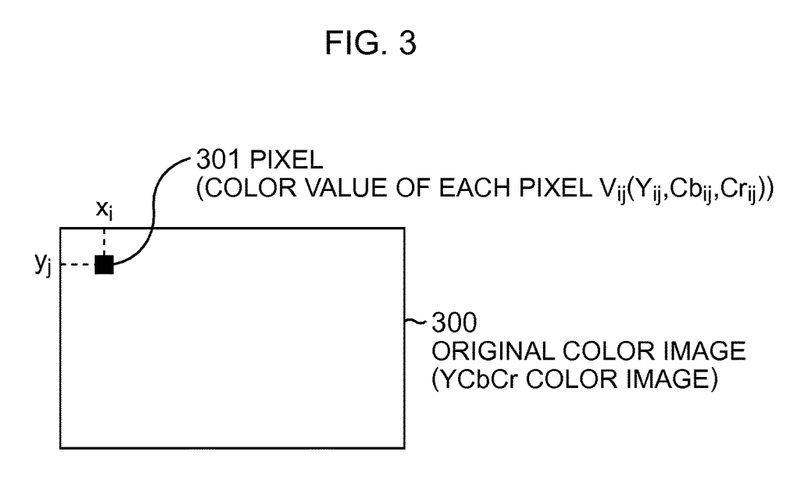
FIG. 3 is a schematic diagram illustrating an embodiment of the present invention and illustrating one example of an original color image.

FIG. 3 is a schematic diagram illustrating the embodiment of the present invention and one example of an original color image 300.

For example, the original color image imaging means 210 acquires the original color image 300 illustrated in FIG. 3. As illustrated in FIG. 3, this original color image 300 is formed including has multiple pixels 301 in the row direction (x direction) and the column direction (y direction). At this time, when "i" and "j" are assumed to be arbitrary natural numbers, color value $V_{ij}$ in pixel $(x_i, y_j)$ can be expressed as $(Y_{ij}, Cb_{ij}, Cr_{ij})$ as illustrated in FIG. 3.

The image processing means 220 performs image processing (color conversion processing) of the original color image taken by the original color image imaging means 210 on the basis of input information input from the input device 108, and generates a color image subjected to color conversion. Specifically, the image processing means 220 is formed including hue rotation processing means 221, hue-rotated color image acquisition means 222, color difference signal processing means 223 and reverse hue rotation processing means 224.

Here, in the image processing means 220, since processing is not performed on luminance signal $Y_{ij}$ among color values $V_{ij}$ ($Y_{ij}, Cb_{ij}, Cr_{ij}$) in pixel $(x_i, y_j)$ of the original color image 300 illustrated in FIG. 3, processing in the CbCr color space which is a two-dimensional color difference plane expressed by CbCr can be considered.

Figure 4:
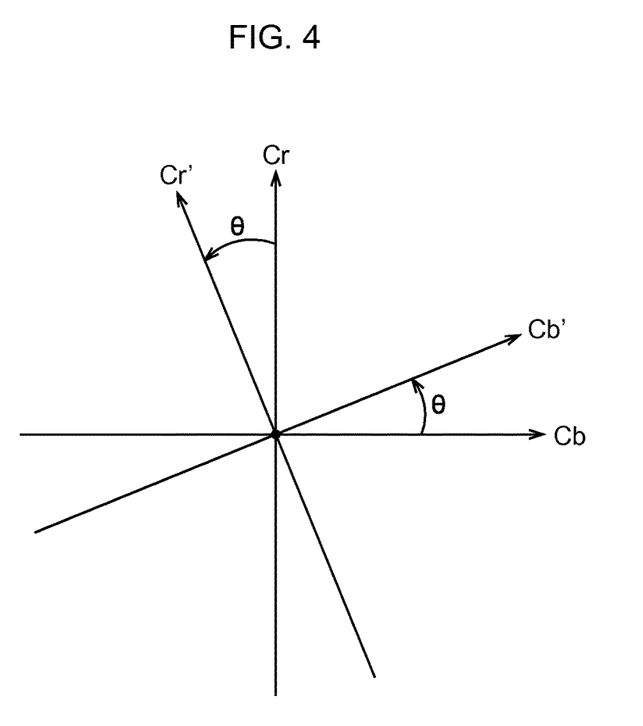
FIG. 4 is a schematic diagram illustrating an embodiment of the present invention and illustrating one example of a Cb-Cr color space.

FIG. 4 is a schematic diagram illustrating the embodiment of the present invention and one example of the CbCr color space.

The CbCr color space in FIG. 4 is defined by the Cb axis set in the horizontal direction and the Cr axis that vertically intersects with the Cb axis.

For each pixel data of the original color image taken by the original color image imaging means 210, as illustrated in FIG. 4, the hue rotation processing means 221 performs hue rotation processing at rotation angle θ at which one color difference signal Cb in the CbCr color space is set to first color difference signal Cb' that is a color difference signal of a color pair (blue and yellow are main) that is easy to be identified by a dichromat of type 1/2 and the other color difference signal Cr is set to second difference signal Cr' that is a color difference signal of a color pair (red and green are main) that is difficult to be identified by the dichromat of type 1/2.

Specifically, as illustrated in FIG. 4, by rotating the Cb axis and the Cr axis by rotation angle θ, the hue rotation processing means 221 sets the Cb' axis as the axis of the color difference signal in which blue and yellow are main, and sets the Cr' axis as the axis of the color difference signal in which red and green are main. By the axis rotation, each of rotated Cb' and Cr' can be expressed as the following equation (1) and equation (2). Here, the value of rotation angle θ is roughly −30°, but, since large variation is estimated depending on individual differences of dichromats, it is necessary to enable adjustment at least in a range between −10° and −50°. However, since rotation angle θ greatly varies depending on individual differences of dichromats, it is not limited to this range.

[Equation 1]

$$Cb'Cb \cos θ + Cr \sin θ \quad (1)$$

$$Cr' = -Cb \sin θ + Cr \cos θ \quad (2)$$

The hue-rotated color image acquisition means 222 acquires a hue-rotated color image subjected to hue rotation processing by the hue rotation processing means 221.

For each pixel data of the hue-rotated color image, the color difference signal processing means 223 performs mixing processing that mixes the component of second color difference signal Cr' with the component of first color difference signal Cb'. At this time, the color difference signal processing means 223 multiplies a coefficient ($K_2$ described later) by the component of second color difference signal Cr' and performs the mixing processing on the component of first color difference signal Cb'. In addition, if necessary, the color difference signal processing means 223 performs amplitude adjustment processing that adjusts the amplitude of first color difference signal Cb' (multiplies coefficient $K_1$ by the component of first color difference signal Cb', which is described later) and adjusts the amplitude of second color difference signal Cr' (multiplies coefficient $K_2$ by the component of second color difference signal Cr', which is described later), in addition to the mixing processing.

Specifically, the color difference signal processing means 223 performs color difference signal processing shown by following equation (3) and equation (4). Here, first color difference signal Cb" after the color difference signal processing is expressed like equation (3), where intensity adjustment processing (amplitude adjustment processing) of chroma is performed on first color difference signal Cb' and mixing processing by second color difference signal Cr' is performed. Second color difference signal Cr" after the color difference signal processing is expressed like equation (4), where intensity adjustment processing (amplitude adjustment processing) of chroma is simply performed on second color difference signal Cr'.

[Equation 2]

$$Cb'' = K_1 Cb' - K_2 (Cr' + K_4) \quad (3)$$

$$Cr'' = K_3 Cr' \quad (4)$$

However, in equation (3), in the present embodiment, $K_1$ denotes the enhancement coefficient of the chroma of "blue-yellow", $K_2$ denotes the coloring coefficient of "red-green", and $K_4$ denotes a bias coefficient to perform correction in a case where there is bias in the level of perception of blue and yellow depending on the user. Here, the sign of coefficient $K_2$ is set to be the minus because a direction in which red is colored as yellow and green is colored as blue is assumed to be the forward direction. Naturally, if the sign is reversed, it is also possible to color red as blue and green as yellow. In a case where $K_2$ is assumed to be a positive value, a hue which a dichromat feels as an achromatic color is two points of "vicinity in which it shifts from yellow to yellow-green" and "vicinity in which it shifts from blue to blue-violet", and it is assumed that colors based on orange from red to yellow are perceived as colors of the yellow system and colors based on blue-green from green to blue are perceived as colors of the blue system. In this case, natural division is achieved because it is possible to provide a state where they are divided into two of the generally-called warm color group and cold color group. On the other hand, in a case where $K_2$ is assumed to be a negative value, a hue which a dichromat feels as an achromatic color is two points of "vicinity in which it shifts from orange to yellow" and "vicinity in which it shifts from cyan to blue", and it is assumed that colors based on yellow-green from yellow to green are perceived as colors of the yellow system and colors based on purple from blue to red are perceived as colors of the blue system. In this case, unnatural division is provided in a sense unlike a general state. However, since it becomes possible to emphasize and display a hue change from red to yellow conversely, it becomes means for effectively solving an identification problem of clear red and brown which a dichromat frequently encounters in daily life, that is, when a concrete example is enumerated, a problem of determination difficulty of the scorch condition of meat, and so on. Moreover, in equation (4), $K_3$ is an enhancement coefficient of the chroma of "red-green" in the present embodiment.

Enhancement coefficients $K_1$ and $K_3$ of chroma can be simultaneously set to numerical values other than 1 for the purpose of general chroma intensity adjustment. However, there is no problem in a state where enhancement coefficients $K_1$ and $K_3$ of chroma remain as they are 1 (that is, remains as they are original images) as long as they are not specially intentioned as described later.

Moreover, there is no problem if coloring coefficient $K_2$ is 1, but it is preferable to change it in some degree on the basis of the finding of man's visual characteristic. For example, as known by the oval of MacAdam, the sensitivity (feeling) of sight with respect to a color change varies depending on a hue. In the case of trichromats (normal color vision persons), the sensitivity in the "red-green" direction takes a value that is about two to three times as high as the sensitivity in the "blue-yellow" direction in a lot of regions. Therefore, in a case where the difference in a trichromat's chroma in the "red-green" direction is intended to be naturally told to a dichromat of type 1/2, it only has to set coloring coefficient $K_2$ to about 2 to 3 (that is, coloring is emphasized on an equation). However, since there is a large individual difference in chroma which a dichromat of type 1/2 feels, it is important to enable adjustment in a wider range on the basis of this value.

In addition, by setting coloring coefficient $K_2$ to be a sufficiently larger value than 2 to 3, it becomes possible to highlight a region with a red tinge or green tinge. It is effective though nature is slightly damaged by performing setting in this way, but there is an effect that it is possible to easily distinguish indiscernible colors. Here, since the relationship between the size of coloring coefficient $K_2$ mentioned above and a visual effect is that the hue change direction is merely reversed as a whole in a case where the sign is reversed, it provides an almost similar effect when it is considered with the absolute value.

Here, an effect in a case where enhancement coefficient $K_1$ or $K_3$ of chroma is set to a value different from 1 is described. By setting enhancement coefficient $K_1$ of the chroma of "blue-yellow" to a value that is smaller than 1 and close to 0, it is possible to suppress the color contrast of "blue-yellow" which a dichromat of type 1/2 can originally see. By doing this, an effect of emphasizing coloring as a result can be expected. Moreover, if enhancement coefficient $K_3$ of the chroma of "red-green" is set to be 0 or close to 0, there is little influence on the sight of a dichromat of type 1/2, but, in a case where a trichromat (normal color vision person) sees this image, there is an effect that "red-green" is removed. Therefore, the trichromat becomes possible to analogize how the dichromat of type 1/2 perceives a processed image.

Moreover, it requires attention since there is a case where the range of color difference signal (Cb", Cr") acquired as a result of performing arithmetic processing of above-mentioned equations (3) and (4) exceeds a defined range. For this, threshold processing is arbitrarily performed.

A coloring method to present regions with a red tinge and green tinge to a dichromat of type 1/2 at the same time has been described above, but it is also possible to display a specific color gamut by easy nonlinear processing (threshold processing) with respect to coloring coefficient $K_2$. For example, in a case where a region with a red tinge or green tinge is found alone and a color image subjected to color conversion is presented, when $K_2'$ is assumed to be a coloring coefficient after threshold processing, following equation (5) is a threshold processing equation in a case where the region with the red tinge is found alone, and following equations (6) is a threshold processing equation in a case where the region with the green tinge is found alone.

[Equation 3]

$$K_2' = \begin{cases} K_2 & (Cr' > 0) \\ 0 & (Cr' \leq 0) \end{cases} \quad (5)$$

$$K_2' = \begin{cases} 0 & (Cr' \geq 0) \\ K_2 & (Cr' < 0) \end{cases} \quad (6)$$

Additionally, it is naturally possible to set the threshold with respect to coloring coefficient $K_2$ to the one different from 0 or set multiple thresholds according to the usage, but details are omitted.

The reverse hue rotation processing means 224 performs reverse hue rotation processing with rotation angle $-\theta$ in the Cb'Cr' color space defined by first color difference signal Cb' and second color difference signal Cr', for each pixel data of a color image subjected to processing by the color difference signal processing means 223. Specifically, the reverse hue rotation processing means 224 performs the reverse hue rotation processing with rotation angle $-\theta$ in order to restore (Cb", Cr") to expression on the original (Cb, Cr) axis. Values subjected to the reverse hue rotation processing using following equations (7) and (8) are assumed to be Cb''' and Cr''' respectively, and, by this means, image processing by the image processing means 220 is completed and a color image subjected to color conversion is generated.

[Equation 4]

$$Cr''' = Cb'' \cos\theta - Cr'' \sin\theta \quad (7)$$

$$Cr''' = Cb'' \sin\theta + Cr'' \cos\theta \quad (8)$$

In addition, for easiness, when enhancement coefficient $K_3$ of the chroma of "red-green" that is rarely related to the sight of a dichromat of type 1/2 is set to 1, bias coefficient $K_4$ is set to 0 with an assumption of a standard user and equations (7) and (8) are directly transformed using (Cb, Cr), they can be expressed by following equations (9) and (10). Normally, it only has to perform image processing by directly calculating these equations (9) and (10).

[Equation 5]

$$Cb''' = (K_1 \cos^2\theta + K_2 \sin\theta \cos\theta + \sin^2\theta)Cb + \{(K_1-1)\sin\theta \cos\theta - K_2 \cos^2\theta\}Cr \quad (9)$$

$$Cr''' = \{(K_1-1)\sin\theta \cos\theta + K_2 \sin^2\theta\}Cb + (K_1 \sin^2\theta - K_2 \sin\theta \cos\theta + \cos^2\theta)Cr \quad (10)$$

The display control means 230 performs control to display the color image subjected to color conversion which is generated by the image processing means 220 on the display unit 109. At this time, the display control means 230 performs control to arrange and display the color image subjected to color conversion and the original color image taken by the original color image imaging means 210 on the display unit 109 or alternately display the both images on the display unit 109 according to an instruction from the user, and so on.

Next, the processing procedure of an image processing method by the multi-function mobile phone (image processing apparatus) 100 according to the embodiment of the present invention is described.

Figure 5:
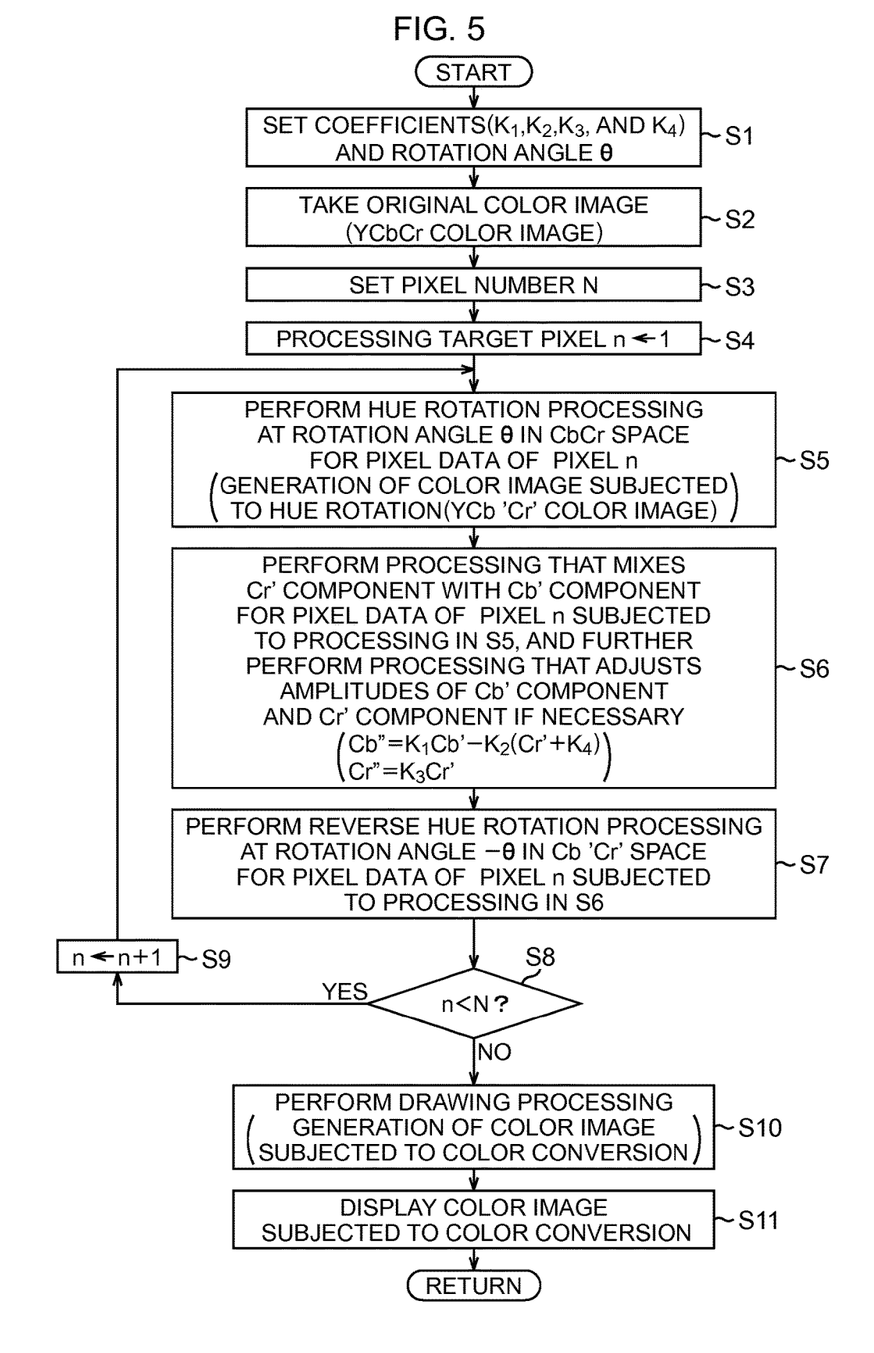
FIG. 5 is a flowchart illustrating one example of a processing procedure of an image processing method by a multi-function mobile phone (image processing apparatus) according to an embodiment of the present invention.

FIG. 5 is a flowchart illustrating one example of the processing procedure of the image processing method by the multi-function mobile phone (image processing apparatus) 100 according to the embodiment of the present invention. In the explanation of the flowchart illustrated this FIG. 5, an explanation is given using the functional components of the multi-function mobile phone 100 illustrated in FIG. 2.

First, when coefficients ($K_1$, $K_2$, $K_3$ and $K_4$) and rotation angle θ are input from the user through the input device 108, in step S1, the image processing means 220 sets coefficients ($K_1$, $K_2$, $K_3$ and $K_4$) and rotation angle θ input from the input device 108.

Subsequently, in step S2, the original color image imaging means 210 takes an original color image of object H expressed by YCbCr on the basis of an optical image of object H. Here, for example, it is assumed that the original color image imaging means 210 takes the original color image 300 illustrated in FIG. 3.

Subsequently, in step S3, the image processing means 220 acquires the original color image taken in step S2 and sets pixel number N of the original color image. Here, for example, it is assumed that the image processing means 220 sets total sensor number N of the original color image 300 illustrated in FIG. 3 and assigns respective numbers of 1 to N to specify respective pixels, to these pixels forming the original color image 300.

Subsequently, in step S4, the image processing means 220 sets variable n indicating a processing target pixel to 1. By this means, processing target pixel n is set.

Subsequently, in step S5, the hue rotation processing means 221 of the image processing means 220 performs hue rotation processing at rotation angle θ at which one color difference signal Cb in the CbCr color space is set to first color difference signal Cb' that is a color difference signal of a color pair (blue and yellow are main) that is easy to be identified by a dichromat of type 1/2 and the other color difference signal Cr is set to second color difference signal Cr' that is a color difference signal of a color pair (red and green are main) that is difficult to be identified by the dichromat of type 1/2, for pixel data of pixel n in the original color image taken in step S2, as illustrated in FIG. 4.

Specifically, as illustrated in FIG. 4, the hue rotation processing means 221 rotates the Cb axis and the Cr axis by rotation angle θ set in step S1, sets the Cb' axis as the axis of a color difference signal in which blue and yellow are main, and sets the Cr' axis as the axis of a color difference signal in which red and green are main. By axis rotation at this rotation angle θ, first color difference signal Cb' and second color difference signal Cr' become above-mentioned equations (1) and (2) respectively. By performing the processing in this step S5 on the original color image taken in step S2, a color image subjected to hue rotation (YCb'Cr' color image) is generated.

Subsequently, in step S6, the color difference signal processing means 223 of the image processing means 220 performs mixing reprocessing that mixes the component of second color difference signal Cr with the component of first color difference signal Cb', for pixel data of pixel n subjected to the processing in step S5. At this time, the color difference signal processing means 223 multiplies coefficient $K_2$ by the component of second color difference signal Cr' and performs the above-mentioned mixing processing on first color difference signal Cb'. In addition, if necessary, the color difference signal processing means 223 performs amplitude adjustment processing that adjusts the amplitude of first color difference signal Cb' (multiplies coefficient $K_1$ by the component of first color difference signal Cb') and adjusts the amplitude of second color difference signal Cr' (multiplies coefficient $K_2$ by the component of second color difference signal Cr'), for the pixel data of pixel n subjected to the processing in step S5. Specifically, the color difference signal processing means 223 performs arithmetic processing shown in above-mentioned equations (3) and (4), but, in this case, the values set in step S1 are used as coefficients $K_1$, $K_2$, $K_3$ and $K_4$.

Subsequently, in step S7, the reverse hue rotation processing means 224 of the image processing means 220 performs reverse hue rotation processing with rotation angle −θ in the Cb'Cr' color space defined by first color difference signal Cb' and second color difference signal Cr', for pixel data of pixel n subjected to the processing in step S6. Specifically, the reverse hue rotation processing means 224 performs the reverse hue rotation processing with rotation angle −θ by the use of above-mentioned equations (7) and (8) in order to restore (Cb", Cr") to expression on the original (Cb, Cr) axis.

Subsequently, in step S8, the image processing means 220 determines whether variable n indicating a processing target pixel is smaller than pixel number N set in step S3.

In a case where variable n indicating the processing target pixel is smaller than pixel number N set in step S3 (S8/YES) as a result of the determination in step S8, it is determined that processing is not performed yet on all pixels of the original color image taken in step S2 yet, and it proceeds to step S9.

When it proceeds to step S9, the image processing means 220 changes processing target pixel n by adding 1 to variable n indicating the processing target pixel. Further, the processing after step S5 is performed on changed pixel n again.

On the other hand, in a case where variable n indicating the processing target pixel is not smaller than pixel number N set in step S3 (S8/NO) as a result of the determination in step S8, it is determined that processing is performed on all pixels of the original color image taken in step S2, and it proceeds to step S10.

When it proceeds to step S10, the image processing means 220 performs drawing processing on the basis of pixel data subjected to the processing in steps S5 to S7. A color image subjected to color conversion is generated by this drawing processing.

Subsequently, in step S11, the display control means 230 performs control to display the color image subjected to color conversion which is generated in step S10 on the display unit 109. At this time, the display control means 230 performs control to arrange and display the color image subjected to color conversion which is generated in step S10 and the original color image taken in step S2 on the display unit 109 or alternately display the both images on the display unit 109 according to an instruction from the user, and so on.

When the processing in step S11 ends, it reruns to "START", and, in a case where the next original color image is taken, it is assumed that the processing in steps S1 to S11 is performed again.

In the multi-function mobile phone (image processing apparatus) 100 according to the embodiment of the present invention described above, mixing processing that mixes the component of second difference signal Cr', which is a color difference signal of a color pair (red and green are main) that is difficult to be identified by a dichromat of type 1/2, with the component of first color difference signal Cb', which is a color difference signal of a color pair (blue and yellow are main) that is easy to be identified by the dichromat of type 1/2, is performed to generate a color image subjected to color conversion (S6 and S10 in FIG. 5).

According to such a configuration, a dichromat of type 1 (protanope)/type 2 (deuteranope) compares object H (or original color image) and the color image subjected to color conversion, and, if a color tone of the color pair that is easy to be identified by the dichromat is changed in the color image subjected to color conversion, it is possible to understand that there is a color of the color pair that is difficult to be identified by the dichromat in a part of object H (or original color image) which corresponds to the part in which the color tone is changed.

As general setting, in a case where coloring coefficient $K_2$ is mixed as a positive value, specifically, in a case where a dichromat of type 1 (protanope)/type 2 (deuteranope) compares object H (or original color image) and the color image subjected to color conversion and a color tone of yellow of the color image subjected to color conversion increases, it is possible to understand that there is red that is difficult to be identified by the dichromat in a part of object H (or original color image) which corresponds to a part in which the color tone of yellow increases. Moreover, in a case where the dichromat of type 1 (protanope)/type 2 (deuteranope) compares object H (or original color image) and the color image subjected to color conversion and a color tone of blue of the color image subjected to color conversion increases, it is possible to understand that there is green that is difficult to be identified by the dichromat in a part of object H (or original color image) which corresponds to a part in which the color tone of blue increases.

Meanwhile, as special setting, in a case where coloring coefficient $K_2$ is mixed as a negative value, a dichromat of type 1 (protanope)/type 2 (deuteranope) compares object H (or original color image), which is known as a red system including purplish red or a dark brown system, and the color image subjected to color conversion. Here, it is possible to determine that it is the red system including purplish red in a case where a color tone of blue of the color image subjected to color conversion increases, and it is the dark brown system in a case where a color tone of blue decreases or a color tone of yellow increases That is, according to the multi-function mobile phone (image processing apparatus) 100 according to the embodiment of the present invention, it is possible to provide a mechanism in which a dichromat of type 1 (protanope)/type 2 (deuteranope) can understand the hue of object H without learning.

(Other Embodiments)

Moreover, a color space expressed by YCbCr is adopted as the one in the color image of object H in the above-mentioned embodiments of the present invention, but it is not limited to this color space in the present invention. The present invention is applicable to a color space that can be expressed by a luminance signal, the first color difference signal that is a color difference signal of a color pair (blue and yellow are main) that is easy to be identified by a dichromat of type 1/2 and the second difference signal that is a color difference signal of a color pair (red and green are main) that is difficult to be identified by the dichromat of type 1/2.

Moreover, the present invention is realized even by performing the following processing.

That is, it is processing that: supplies software (program) that realizes the functions of the above-mentioned embodiments of the present invention to a system or apparatus through a network or various kinds of storage media; and causes a computer (or a CPU, an MPU, and so on) of the system or device to read and execute the program.

This program and a computer-readable recording medium that stores the program are included in the present invention.

Here, the above-mentioned embodiments of the present invention are merely the ones showing specific examples when the present invention is implemented, and the technical scope of the present invention should not be limitedly interpreted by these. That is, the present invention can be implemented in various forms without departing from the technical idea thereof or the main features thereof.

INDUSTRIAL APPLICABILITY

According to the present invention, it is possible to provide a mechanism in which a dichromat can understand the hue of object H without learning.

The invention claimed is:

1. An image processing apparatus comprising:
a processor; and
a memory coupled to the processor, wherein the memory includes instructions executable by the processor to:
perform hue rotation processing at rotation angle θ at which one color difference signal of two color difference signals in a color space defined by the two color difference signals is set to a first color difference signal that is a color difference signal of a color pair that is easy to be perceptible by a dichromat and the other color difference signal of the two color difference signals is set to a second difference signal that is a color difference signal of a color pair that is difficult to be perceptible by the dichromat, for each pixel data of an original color image of an object, which is acquired by imaging the object and expressed by a luminance signal and the two color difference signals;
acquire a color image subjected to hue rotation on which the hue rotation processing is performed;
perform mixing processing that mixes a component of the second color difference signal with a component of the first color difference signal, for each pixel data of the color image subjected to hue rotation;
perform reverse hue rotation processing at rotation angle −θ in the color space defined by the first color difference signal and the second color difference signal, for each pixel data of the color image processed by the mixing processing; and
display the color image subjected to the reverse hue rotation processing on a display unit as a color image subjected to color conversion.

2. The image processing apparatus according to claim 1, wherein the instructions are further executable by the processor to alternately display the color image subjected to color conversion and the original color image on the display unit.

3. The image processing apparatus according to claim 1, wherein the instructions executable by the processor to perform mixing processing, further include instructions to:
multiply a coefficient by a component of the second color difference signal and perform the mixing processing on a component of the first color difference signal.

4. The image processing apparatus according to claim 1, wherein instructions executable by the processor to perform mixing processing, further include instructions to:

perform amplitude adjustment processing that adjusts amplitudes of the first color difference signal and the second color difference signal, in addition to the mixing processing.

5. The image processing apparatus according to claim 1, wherein the dichromat is a protanope or deuteranope;

the first color difference signal is a color difference signal in which blue and yellow are main; and the second color difference signal is a color difference signal in which red and green are main.

6. An image processing method comprising:

a hue rotation processing step of performing hue rotation processing at rotation angle θ at which one color difference signal of two color difference signals in a color space defined by the two color difference signals is set to a first color difference signal that is a color difference signal of a color pair that is easy to be perceptible by a dichromat and the other color difference signal of the two color difference signals is set to a second difference signal that is a color difference signal of a color pair that is difficult to be perceptible by the dichromat, for each pixel data of an original color image of an object, which is acquired by imaging the object and expressed by a luminance signal and the two color difference signals;

a color image acquisition step of acquiring a color image subjected to hue rotation on which the hue rotation processing is performed;

a color difference signal processing step of performing mixing processing that mixes a component of the second color difference signal with a component of the first color difference signal, for each pixel data of the color image subjected to hue rotation;

a reverse hue rotation processing step of performing reverse hue rotation processing at rotation angle −θ in the color space defined by the first color difference signal and the second color difference signal, for each pixel data of the color image processed in the color difference signal processing step; and a display control step of performing control to display the color image subjected to the reverse hue rotation processing in the reverse hue rotation processing step on a display unit as a color image subjected to color conversion.

* * * * *